(12) United States Patent
Elsässer et al.

(10) Patent No.: US 7,591,256 B2
(45) Date of Patent: Sep. 22, 2009

(54) EXHAUST GAS RECIRCULATION APPARATUS FOR AN INTERNAL COMBUSTION ENGINE AND THE RESPECTIVE OPERATING METHOD

(75) Inventors: Alfred Elsässer, Keltern (DE); Bernd Mahr, Plochingen (DE)

(73) Assignee: Mahle International GmbH, Stuttgart (DE)

( * ) Notice: Subject to any disclaimer, the term of this patent is extended or adjusted under 35 U.S.C. 154(b) by 103 days.

(21) Appl. No.: 11/818,863

(22) Filed: Jun. 15, 2007

(65) Prior Publication Data

US 2007/0289582 A1 Dec. 20, 2007

(30) Foreign Application Priority Data

Jun. 16, 2006 (DE) .................. 10 2006 028 146

(51) Int. Cl.
*F02M 25/07* (2006.01)
*F02B 47/08* (2006.01)

(52) U.S. Cl. .............................. 123/568.24; 123/568.2; 123/568.21

(58) Field of Classification Search ............ 123/568.11, 123/568.16, 568.21, 568.23, 568.24, 568.26–568.28, 123/568.2; 251/129.15; 361/152–154; 701/108
See application file for complete search history.

(56) References Cited

U.S. PATENT DOCUMENTS 4,398,524 A * 8/1983 Rachedi ................. 123/568.29
5,628,296 A * 5/1997 Herrington et al. ..... 123/568.21
6,164,270 A * 12/2000 Bidner et al. .......... 123/568.16
6,253,748 B1 * 7/2001 Engel et al. ............ 123/568.21

FOREIGN PATENT DOCUMENTS

| DE | 199 42 329 A1 | 2/2001 | |
|---|---|---|---|
| DE | 10 2004 044 249 A1 | 3/2006 | |
| EP | 0 811 762 A1 | 12/1997 | |
| EP | 1 020 633 A1 | 7/2000 | |
| JP | 2006112320 A * | 4/2006 | ............ 123/568.16 |

* cited by examiner

*Primary Examiner*—Willis R Wolfe, Jr.
(74) *Attorney, Agent, or Firm*—Collard & Roe, P.C.

(57) ABSTRACT

An exhaust gas recirculation apparatus (5) for an internal combustion engine (1), in particular in a motor vehicle, has an exhaust gas recirculation line (9) which can be connected at the inlet end to an exhaust gas system (4) of the internal combustion engine (1) and at the outlet end to a fresh gas system (3) of the internal combustion engine (1) and having a return valve (12) arranged in the exhaust gas recirculation line (9) for adjusting an exhaust gas recirculation rate by varying the flow-through cross section of the exhaust gas recirculation line (9). To improve the efficacy of the exhaust gas recirculation, the exhaust gas recirculation valve (12) is designed so that it adjusts the respective exhaust gas recirculation rate at least in one operating state of the exhaust gas recirculation apparatus (5), so that it alternately reduces and increases and/or blocks and opens the flow-through cross section of the exhaust gas recirculation line (9) at predetermined or regulated switching points in time.

28 Claims, 2 Drawing Sheets

EXHAUST GAS RECIRCULATION APPARATUS FOR AN INTERNAL COMBUSTION ENGINE AND THE RESPECTIVE OPERATING METHOD

CROSS REFERENCE TO RELATED APPLICATIONS

Applicant claims priority under 35 U.S.C. §119 of German Application No. 10 2006 028 146.2 filed Jun. 16, 2006.

The present invention relates to an exhaust gas recirculation apparatus for an internal combustion engine, in particular in a motor vehicle. The invention also relates to a method for operating an exhaust gas recirculation apparatus of an internal combustion engine, in particular in a motor vehicle.

In internal combustion engines, exhaust gas recirculation is being used to an increasing extent to improve emission levels and the economic benefit of the internal combustion engine. To be able to adjust the quantity of recirculated exhaust, i.e., the exhaust gas recirculation rate, abbreviated EGR rate, an exhaust gas recirculation apparatus, abbreviated EGR apparatus, usually comprises an exhaust gas recirculation valve, abbreviated EGR valve, which is installed in an exhaust gas recirculation line, abbreviated EGR line. To adjust the respective EGR rate, the EGR valve causes a change in the flow-through cross section of the EGR line. It is fundamentally possible to adjust the desired EGR rate by the fact that the EGR valve adjusts the flow-through cross section for the EGR line to correlate with the desired EGR rate. The greater the flow-through cross section of the EGR line, the lower is the throttling effect and therefore the higher is the achievable EGR rate.

The present invention relates to the problem of providing another embodiment for an EGR apparatus and/or for a respective operating method that will be characterized in particular by improved mixing of the recirculated exhaust gases with the fresh gas supplied to the internal combustion engine and/or by a reduced risk of soiling due to soot deposits in the EGR apparatus and/or its components.

This problem is solved according to this invention by the subjects of the independent claims. Advantageous embodiments are the subject of the dependent claims.

The invention is based on the general idea of adjusting the respective EGR rate through alternately increasing and decreasing the flow-through cross section of the EGR line at predetermined or regulated switching points in time, which makes it possible to implement a predetermined or regulated clock frequency in particular. In this way, at least during an operating state of the EGR apparatus assigned to this fixed-cycle operation, the flow-through cross section of the EGR line is alternately sealed off, in particular blocked, to varying extents and opened to varying extents, in particular opened fully, in the clock frequency. This makes it possible to generate a cycled, i.e., pulsed exhaust gas flow in particular, i.e., a discontinuous exhaust gas flow. Such a pulsed exhaust gas flow necessarily has a higher flow rate within its pluses in comparison with a continuous exhaust gas flow. The higher flow rate of the recirculated exhaust gases leads to improved mixing with fresh gas at the outlet end of the EGR line and counteracts deposition of soot within the EGR line.

In an advantageous embodiment, the clock frequency of the EGR valve may be adjusted to a frequency in the pressure distribution of the exhaust gas at the entrance end of the EGR line so that the flow-through cross section of the EGR line is then enlarged as soon as and as long as the exhaust gas pressure is above a predetermined pressure level, which may be formed in particular by the fresh gas pressure at the outlet end of the EGR line. In such an embodiment, pressure peaks occurring in the exhaust gas line can be utilized to drive the exhaust gas recirculation. This is advantageous when an elevated flow resistance prevails in the EGR line, e.g., due to an exhaust gas recirculation cooler, abbreviated as EGR cooler, arranged therein for cooling the recirculated exhaust gases and/or when the fresh gas pressure in the fresh gas system is comparatively high, e.g., in the case of a supercharged internal combustion engine.

Other important features and advantages of the invention are derived from the subclaims, the drawings and the respective description of the figures on the basis of the drawings.

It is self-evident that the features mentioned above and those yet to be explained below may be used not only in the particular combination given but also in other combinations or alone without going beyond the scope of the present invention.

BRIEF DESCRIPTION OF THE DRAWINGS

Preferred exemplary embodiments of the invention are depicted in the drawings and are explained in greater detail in the following description, where the same reference numerals refer to the same or similar or functionally similar components.

In the schematic drawings

Figure 1:
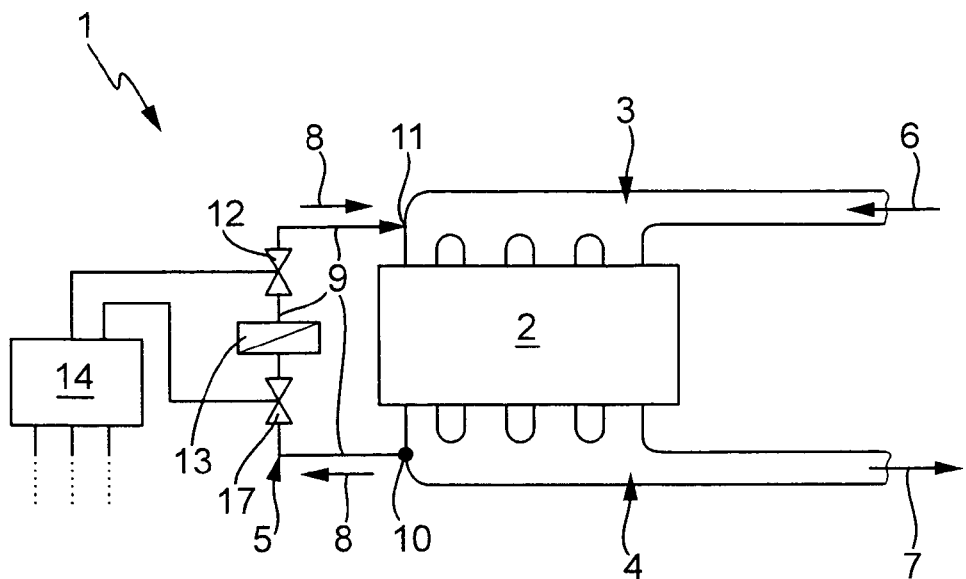
FIG. 1 shows a greatly simplified basic diagram like a wiring diagram of an internal combustion engine with an exhaust gas recirculation system.

According to FIG. 1, an internal combustion engine 1 comprises an engine block 2, a fresh gas system 3, an exhaust system 4 and an exhaust gas recirculation system 5, abbreviated EGR apparatus 5. The fresh gas system 3 supplies fresh gas to the engine block 2 according to the arrow 6 and/or to combustion chambers or cylinders (not shown in detail) of the engine block 2. The exhaust system 4 removes exhaust gas from the engine block 2 and/or from the combustion chambers or cylinders according to the arrow 7. The EGR apparatus 5 serves to supply exhaust gas removed from the exhaust side of the internal combustion engine 1 to the fresh gas side of the internal combustion engine 1, again according to the arrows 8. To do so, the EGR apparatus 5 includes an exhaust gas recirculation line 9, abbreviated EGR line 9, which is connected to the exhaust system 4 at the inlet end at 10 and to the fresh gas system 3 at the outlet end at 11. The respective connection points 10, 11 are merely symbolized here as an example. It is clear that the removal and/or introduction of the exhaust gases to be recirculated may also be accomplished by any other suitable method.

The EGR apparatus 5 also comprises an exhaust gas recirculation valve 12, abbreviated EGR valve 12, which is arranged in the EGR line 9. The EGR valve 12 is designed so that it can vary the flow-through cross section of the EGR line 9 and can therefore adjust the exhaust gas recirculation rate, abbreviated EGR rate, during operation of the internal combustion engine 1. The EGR rate describes the amount of recirculated exhaust gas 8 in the mixture of fresh gas 6 and recirculated exhaust gas 8 supplied to the engine block 2 and/or its combustion chambers or cylinders. This EGR rate and/or the amount of recirculated exhaust gas 8 depends in particular on the prevailing operating state of the internal combustion engine 1.

With the preferred embodiment shown here, the EGR apparatus 5 also includes an exhaust gas recirculation cooler 13, abbreviated EGR cooler 13, with which the recirculated exhaust gas 8 is cooled before being introduced into the fresh gas side. The EGR valve 12 is preferably arranged in the EGR line 9 downstream from the EGR cooler 13. Subsequently the EGR valve 12 is acted upon only with cooled exhaust gas 8 during operation, so that EGR valve 12 can be manufactured comparatively inexpensively, e.g., using plastics.

In addition, a controller 14 is also arranged here and is coupled to the EGR valve 12 for actuation thereof and controls the EGR valve 12 as a function of various parameters and/or as a function of the respective operating state of the internal combustion engine 1. The controller 14 may be integrated as hardware into an engine control unit (not shown) and/or implemented as software in said engine control unit.

The EGR valve 12 is designed and controlled by the controller 14 in such a way that it adjusts the respective EGR rate in a predetermined operating state of the EGR apparatus 5, so that it alternately decreases and/or blocks and increases and/or opens the flow-through cross section of the EGR line 9 at predetermined and/or regulated switching points in time, in particular with a predetermined and/or regulated clock frequency.

The EGR valve 12 thus does not act as a throttle which permanently adjusts the flow-through cross section of the EGR line 9 at a certain cross-sectional level as a function of the EGR rate but instead operates with a flow-through cross section which is permanently variable, preferably with the clock frequency, at least in said operating state. Subsequently a more or less cycled or pulsed exhaust gas flow develops for the recirculated exhaust gas. Within the individual pulses, the recirculated exhaust gas 8 may achieve a comparatively high flow rates. Therefore, the mixing on the fresh gas end is improved, while at the same time the deposition of soot in the EGR line 9, the EGR valve 12 and also in the EGR cooler 13 is inhibited.

The EGR apparatus 5 may optionally also be equipped with a safety valve 17, which is installed in the EGR line 9 upstream from the EGR valve 12, preferably also upstream from the EGR cooler 13. The controller 14 can block the EGR line 9 in case of need by means of the safety valve 17, e.g., to keep especially high pressures, e.g., those which can occur in engine braking operation, away from the EGR valve 12 and/or its bearings and/or seals.

Figure 2:
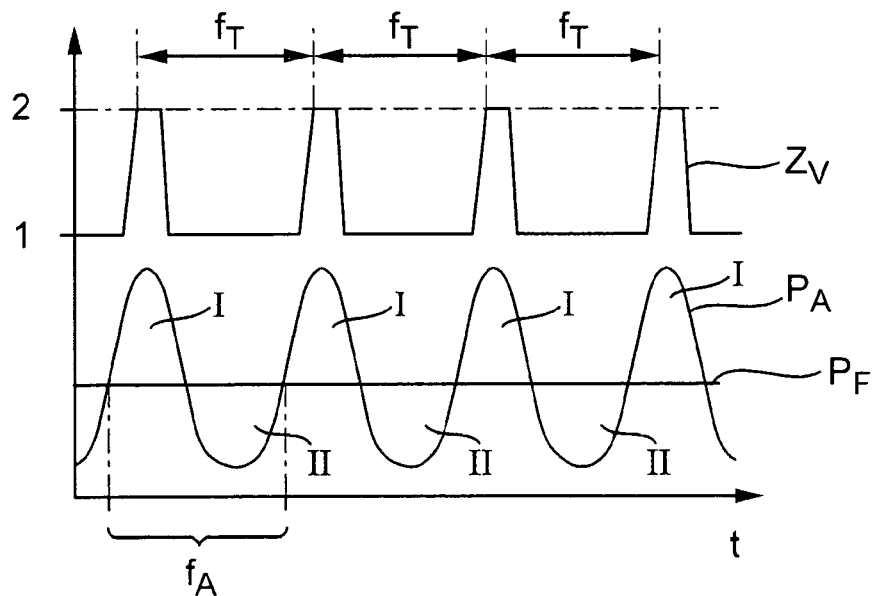
FIG. 2 shows a diagram in which the curves for the exhaust gas pressure, the fresh gas pressure and the switch positions of an exhaust gas recirculation valve are plotted as a function of time.

According to FIG. 2, the exhaust gas pressure on the inlet end 10 of the EGR line 9 has a curve $p_A$ over time that is characterized by periodic pressure fluctuations, e.g., with a frequency $f_A$. The exhaust gas pressure varies along the time axis t according to the respective rotational speed of the internal combustion engine 1, thereby defining the frequency $f_A$. In contrast with that, the fresh gas pressure on the exhaust end 11 of the EGR line 9 during steady-state operating states may have a more or less constant pressure distribution $p_F$, which is plotted here as a straight line in the pressure distribution of the exhaust gas $p_A$. In certain operating states, regions I in which the exhaust gas pressure is above the fresh gas pressure and regions II in which the exhaust gas pressure is below the fresh gas pressure may exist.

FIG. 2 also shows a curve of the switching states $Z_V$ of the EGR valve 12 plotted as a function of time. The diagram shows a first switching state of the EGR valve with a line I and a second switching state with a line II. The individual switching states may each represent a first and/or second position or a first and/or second end position of the EGR valve 12—depending on the design of the EGR valve 12. In the first switching state, the EGR valve minimizes or blocks the flow-through cross section of the EGR line 9. In the second state the EGR valve 12 causes maximization of the opening, i.e., complete opening of the flow-through cross section of the EGR line 9.

In the example shown in FIG. 2, the EGR valve 12 alternates between the two switching states at the aforementioned switching points in time so that in particular said clock frequency $f_T$ is implemented. As FIG. 2 indicates, the clock frequency $f_T$ is preferably coordinated with the pressure distribution of the exhaust gas $p_A$ in a targeted manner so that the EGR valve 12 is always open, i.e., is switched to the second switch state, when the exhaust gas pressure is above the fresh gas pressure $p_F$. This achieves the result that the regions II having an exhaust gas pressure below the fresh gas pressure are more or less masked out by the exhaust gas recirculation, so that only the regions I with an exhaust gas pressure above the fresh gas pressure are involved in the exhaust gas recirculation. On the whole, this makes it possible to increase the pressure level available for exhaust gas recirculation. In this way, a sufficient exhaust gas recirculation can be achieved at relatively high fresh gas pressures. To do so, the controller 14 knows or ascertains the frequency $f_A$ of the exhaust gas pressure distribution $p_A$ for the respective operating state of the internal combustion engine 1 and accordingly selects a suitable clock frequency $f_T$, i.e., of the same size for the EGR valve 12.

It is clear that instead of the fresh gas pressure $p_F$, another suitable pressure value may be used to control the EGR valve 12 to open and/or close.

Figure 3A:
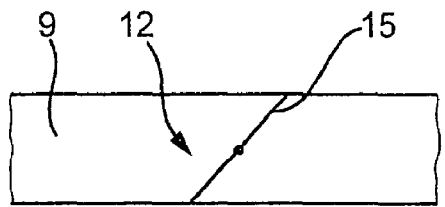
FIG. 3A through 3C show greatly simplified diagrams in longitudinal section of an exhaust gas recirculation valve in three different switch states.
Figure 3B:
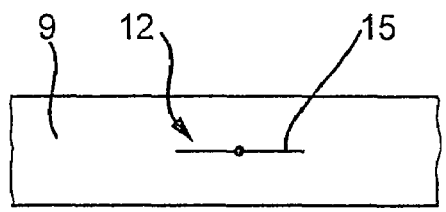
Figure 3C:
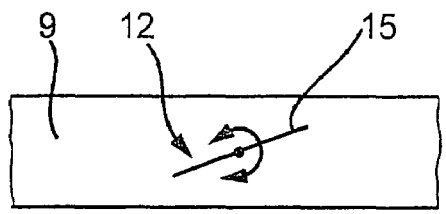

In the embodiment shown in FIGS. 3A through 3C, the EGR valve 12 is designed as a discontinuous switching valve. Such a switching valve that operates discontinuously is characterized in that a valve member 15 can be switched between at least two end positions. FIG. 3A shows the first end position in which the valve member 15 minimizes the flow-through cross section of the EGR line 9 or blocks it—as is the case here. FIG. 3B shows the valve member 15, which has been adjusted into its second end position, in which it maximizes the flow-through cross section of the EGR line 9 or—as is the case here—opens it completely. The valve member 15 assumes the first end position to reduce the flow-through cross section of the EGR line 9, while it assumes the second end position to increase the flow-through cross section of the EGR line 9. In the case of the discontinuous switching valve, the respective EGR rate is adjusted by the fact that the controller 14 selects the switching points in time for switching the EGR valve 12 between the end positions in a suitable manner. The discontinuous EGR valve 12 thus operates according to the principle of so-called pulse width modulation, abbreviated PWM. In switching to the second end position, the flow-through cross section of the EGR line 9 is maximally opened. In switching back to the first end position, the flow-through cross section is minimized and/or blocked. The EGR rate is defined by the pulse width, i.e., the period of time during which the EGR valve 12 assumes its second end position. The EGR rate can be adjusted by varying, i.e., modulating, this pulse width. However, since the exhaust gas pressure itself follows a periodic characteristic, the analogy with PWM is applicable only to a limited extent. In contrast with PWM, in targeted utilization of the pressure peaks on the exhaust end, it is possible with the help of comparatively small pulse periods to adjust an EGR that is greater than the EGR rate that is adjusted with a permanently open EGR valve because backflow is prevented.

In an advantageous refinement, the controller 14 may switch the EGR valve 12 and/or its valve member 15 into the first end position shown in FIG. 3A to adjust a low EGR rate and/or to block the EGR line 9 and keep it in this position for the duration of this low EGR rate and/or for the duration of the blockage. To adjust a moderate EGR rate, the controller 14 actuates the EGR valve 12 for switching into the second end position according to FIG. 3B, in which it then holds the valve member for the duration of the moderate EGR rate. Only for adjusting a high EGR rate does the controller 14 control the EGR valve 12 with the particular clock frequency suitable in each case to switch its valve member 15 permanently between the end positions. The adjustment of the high EGR rate in this embodiment thus forms the operating state of the EGR apparatus 5 in which the EGR valve 12 increases and decreases the flow-through cross section of the EGR line 9 in alternation with the particular clock frequency suitable in each case. The terms "low" and "moderate" and "high" are to be understood as relative terms and are based on one another. Accordingly, the average EGR rate is greater than the low EGR rate and is smaller than the higher EGR rate.

The embodiment shown in FIGS. 3A through 3C thus permits the adjustment of the particular clock frequency desired in each case on the one hand, while on the other hand also permitting a change in the EGR rate. By varying the pulse period, for example the EGR rate can be varied at a certain clock frequency.

In order to be able to achieve pulsed exhaust gas recirculation with the help of a discontinuous switching valve, the EGR valve 12 operates with a servo drive (not shown here) that is drive-coupled to the valve member 15 and is designed so that it allows very short switching times for switching between the two end positions. For example, switching times of less than 5 ms or less than 3 ms are feasible.

In the example shown here, the valve member 15 is designed as a gate valve, in particular as a butterfly valve. Essentially, however, other embodiments are also conceivable, e.g., as a swivel valve or a rotary slide valve.

Figure 4A:
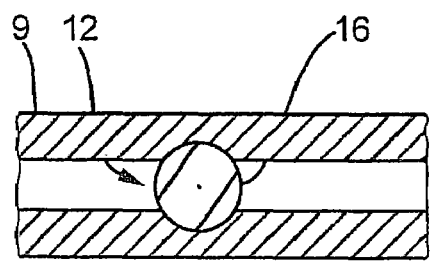
FIG. 4A through 4C show views like those in FIGS. 3A through 3C but in a different embodiment.
Figure 4B:
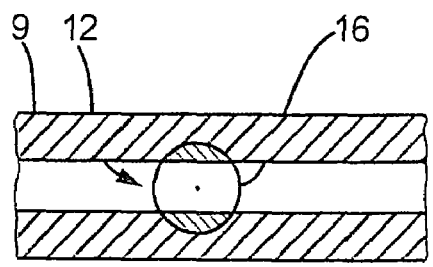
Figure 4C:
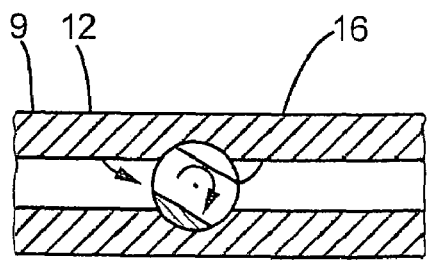

In another embodiment, which is shown in FIGS. 4A through 4C as an example, the EGR valve 12 may be designed as a continuous switching valve. With a continuous switching valve, a valve member 16 is actuated for the operating state with the cycled EGR valve 12 so that it permanently and alternately runs through a first position and a second position and thereby permanently decreases and increases the flow-through cross section of the EGR line 9 in alternation. In its first position, the valve member blocks or minimizes the flow-through cross section of the EGR line 9. In its second position, the valve member 16 causes complete opening or maximization of the flow-through cross section of the EGR line 9. These two positions need not be end positions. They are preferably positions that the valve can run through without any change in the direction of movement of the valve member 16. For example, valve member 16 here may be a rotary slide valve. Essentially, however, other designs are also conceivable.

To this end, the actuator 16 may be drive-connected, e.g., to a servo drive (not shown here), which is itself driven to rotate and which drives the valve member 16 to rotate. Essentially the rotating movement of the actuator may also be converted into a bidirectional lifting movement or swiveling movement of the valve member 16 by way of a corresponding gear arrangement.

The desired EGR rate in each case can be adjusted with the switching valve, which operates continuously, by the fact that the controller 14 selects the speed with which the valve member 16 permanently and alternately runs through the two positions accordingly. The clock frequency is also set through the choice of the speed. A variation in the EGR rate at a constant clock frequency is not readily possible in the embodiment according to FIGS. 4A through 4C. For example, an embodiment in which the adjusting rate of the valve member 16 is variable by way of the adjustment path, i.e., here the adjustment angle, is also conceivable. In this way, the relationship between the opening and closing periods which is essentially rigidly predetermined by the geometry, can be varied in a certain range which depends on the respective system inertia.

In the example shown in FIG. 4A, the actuator member 16 assumes a modified first position in which it does not block the flow-through cross section of the EGR line but instead leaves a minimal flow-through cross section free.

In the embodiment shown in FIGS. 4A through 4C, the controller 14 may also be designed so that it actuates the EGR valve 12 for blocking the EGR line 9 or for adjusting a low EGR rate, so that its valve member 16 is moved into the first position according to FIG. 4A and remains in this first position for the duration of the blockage and/or the low EGR rate. For adjusting a moderate EGR rate, the controller 14 may control the EGR valve 12, so that the valve member 16 moves into the second position according to FIG. 4B and remains there for the duration of the moderate EGR rate. In addition, the controller 14 may also control the EGR valve 12 for adjusting a high EGR rate, so that its valve member 16 permanently and alternately runs through the two positions at the predetermined clock frequency. During the high EGR rate the aforementioned certain EGR rate of the aforementioned certain operating state with a cycled exhaust gas flow of the EGR apparatus 5 prevails.

The invention is claimed is:

1. An exhaust gas recirculation apparatus for an internal combustion engine (1), in particular in a motor vehicle, having an exhaust gas recirculation line (9) which can be connected at the inlet end to an exhaust gas system (4) of an internal combustion engine (1) and at the exhaust end to a fresh gas system (3) of the internal combustion engine (1), having an exhaust gas recirculation valve (12) arranged in the exhaust gas recirculation line (9) for adjusting an exhaust gas recirculation rate by varying the flow-through cross section of the exhaust gas recirculation line (9), whereby the exhaust gas recirculation valve (12) is designed so that it adjusts the respective exhaust gas recirculation rate in a predetermined operating state of the exhaust gas recirculation apparatus (5) by alternately increasing and decreasing and/or opening and blocking the flow-through cross section of the exhaust gas recirculation line (9) at predetermined or regulated switching points in time; and wherein a safety valve (17) for blocking the exhaust gas recirculation line (9) as needed is arranged in the exhaust gas recirculation apparatus (9) upstream from the exhaust gas recirculation valve (12).

2. An exhaust gas recirculation apparatus for an internal combustion engine (1), in particular in a motor vehicle, having an exhaust gas recirculation line (9) which can be connected at the inlet end to an exhaust gas system (4) of an internal combustion engine (1) and at the exhaust end to a fresh gas system (3) of the internal combustion engine (1), having an exhaust gas recirculation valve (12) arranged in the exhaust gas recirculation line (9) for adjusting an exhaust gas recirculation rate by varying the flow-through cross section of the exhaust gas recirculation line (9), whereby the exhaust gas recirculation valve (12) is designed so that it adjusts the respective exhaust gas recirculation rate in a predetermined operating state of the exhaust gas recirculation apparatus (5) by alternately increasing and decreasing and/or opening and blocking the flow-through cross section of the exhaust gas recirculation line (9) at predetermined or regulated switching points in time; wherein the switching points in time are selected so that they define a clock frequency ($f_T$) for the exhaust gas recirculation valve (12), which is adjusted to a frequency ($f_A$) in the pressure distribution of the exhaust gas ($P_A$) at the inlet end (10) of the exhaust gas recirculation line (9), such that the flow-through cross section of the exhaust gas recirculation line (9) is increased or opened when the exhaust gas pressure is above a predetermined pressure level.

3. The exhaust gas recirculation apparatus according to claim 2, wherein the predetermined pressure value is formed by the fresh gas pressure ($P_F$) at the exhaust end (11) of the exhaust gas recirculation line (9).

4. The exhaust gas recirculation apparatus according to claim 2, wherein the exhaust gas recirculation valve (12) is arranged downstream from an exhaust gas recirculation cooler (13) arranged in the exhaust gas recirculation line (9).

5. The exhaust gas recirculation apparatus according to claim 2, wherein the exhaust gas recirculation valve (12) is designed as a discontinuous switching valve whose valve member (15) can be switched at least between a first end position, which it assumes to reduce or block the flow-through cross section of the exhaust gas recirculation line (9) and in which it blocks or minimizes the flow-through cross section of the exhaust gas recirculation line (9), and a second end position which it assumes to increase or open the flow-through cross section of the exhaust gas recirculation line (9) and in which it maximizes or completely opens the flow-through cross section of the exhaust gas recirculation line (9).

6. The exhaust gas recirculation apparatus according to claim 5, wherein the exhaust gas recirculation valve (12) has an actuator drive that is drive-coupled to the valve member (15), said actuator drive being designed so that it allows direct switching between the end positions and/or it allows switching times of less than 5 ms or less than 3 ms for switching between the end positions.

7. The exhaust gas recirculation apparatus according to claim 5, wherein a controller (14) is provided, adjusting the respective exhaust gas recirculation rate by selecting the switching points in time for switching between the end positions.

8. The exhaust gas recirculation apparatus according to claim 2, wherein the exhaust gas recirculation valve (12) is designed as a continuous switching valve whose valve member (16) moves permanently and alternately into a first position in which it blocks or minimizes the flow-through cross section of the exhaust gas recirculation line (9), at least in a predetermined or regulated operating state of the exhaust gas recirculation apparatus (5), to adjust the respective exhaust gas recirculation rate, and into a second position in which it maximizes or completely opens the flow-through cross section of the exhaust gas recirculation line (9), thereby permanently and alternately decreasing and increasing and/or blocking and opening the flow-through cross section of the exhaust gas recirculation line.

9. The exhaust gas recirculation apparatus according to claim 8, wherein a controller (14) is provided which adjusts the respective exhaust gas recirculation rate through selection of the speed with which the valve member (16) permanently and alternately moves into the two positions.

10. The exhaust gas recirculation apparatus according to claim 8, wherein the exhaust gas recirculation valve (12) has an actuator drive that is drive-coupled to the valve member (16) and is driven to rotate, driving the valve member (16) rotationally or bidirectionally, and/or the controller (14) and/or the actuator drive is/are designed in such a way that the adjusting speed of the valve member (16) is variable as a function of the adjustment distance.

11. An exhaust gas recirculation apparatus for an internal combustion engine (1), in particular in a motor vehicle, having an exhaust gas recirculation line (9) which can be connected at the inlet end to an exhaust gas system (4) of an internal combustion engine (1) and at the exhaust end to a fresh gas system (3) of the internal combustion engine (1), having an exhaust gas recirculation valve (12) arranged in the exhaust gas recirculation line (9) for adjusting an exhaust gas recirculation rate by varying the flow-through cross section of the exhaust gas recirculation line (9), whereby the exhaust gas recirculation valve (12) is designed so that it adjusts the respective exhaust gas recirculation rate in a predetermined operating state of the exhaust gas recirculation apparatus (5) by alternately increasing and decreasing and/or opening and blocking the flow-through cross section of the exhaust gas recirculation line (9) at predetermined or regulated switching points in time; and wherein a controller (14) is provided that switches the exhaust gas recirculation valve (12) into its first end position for blocking the exhaust gas recirculation line or for adjusting a low exhaust gas recirculation rate and holds it in that position.

12. The exhaust gas recirculation apparatus according to claim 11, wherein a controller (14) is provided, switching the exhaust gas recirculation valve (12) into its second end position to adjust a moderate exhaust gas recirculation rate and holding it in that position.

13. The exhaust gas recirculation apparatus according to claim 11, wherein a controller (14) is provided which switches the exhaust gas recirculation valve (12) permanently between its end positions to adjust a high exhaust gas recirculation rate at the predetermined clock frequency.

14. An exhaust gas recirculation apparatus for an internal combustion engine (1), in particular in a motor vehicle, having an exhaust gas recirculation line (9) which can be connected at the inlet end to an exhaust gas system (4) of an internal combustion engine (1) and at the exhaust end to a fresh gas system (3) of the internal combustion engine (1), having an exhaust gas recirculation valve (12) arranged in the exhaust gas recirculation line (9) for adjusting an exhaust gas recirculation rate by varying the flow-through cross section of the exhaust gas recirculation line (9), whereby the exhaust gas recirculation valve (12) is designed so that it adjusts the respective exhaust gas recirculation rate in a predetermined operating state of the exhaust gas recirculation apparatus (5) by alternately increasing and decreasing and/or opening and blocking the flow-through cross section of the exhaust gas recirculation line (9) at predetermined or regulated switching points in time; and wherein a controller (14) is provided, switching the exhaust gas recirculation valve (12) into its second end position to adjust a moderate exhaust gas recirculation rate and holding it in that position.

15. The exhaust gas recirculation apparatus according to claim 14,
wherein a controller (14) is provided which switches the exhaust gas recirculation valve (12) permanently between its end positions to adjust a high exhaust gas recirculation rate at the predetermined clock frequency.

16. The exhaust gas recirculation apparatus according to claim 14,
wherein a controller (14) is provided that switches the exhaust gas recirculation valve (12) into its first end position for blocking the exhaust gas recirculation line or for adjusting a low exhaust gas recirculation rate and holds it in that position.

17. An exhaust gas recirculation apparatus for an internal combustion engine (1), in particular in a motor vehicle,
having an exhaust gas recirculation line (9) which can be connected at the inlet end to an exhaust gas system (4) of an internal combustion engine (1) and at the exhaust end to a fresh gas system (3) of the internal combustion engine (1),
having an exhaust gas recirculation valve (12) arranged in the exhaust gas recirculation line (9) for adjusting an exhaust gas recirculation rate by varying the flow-through cross section of the exhaust gas recirculation line (9),
whereby the exhaust gas recirculation valve (12) is designed so that it adjusts the respective exhaust gas recirculation rate in a predetermined operating state of the exhaust gas recirculation apparatus (5) by alternately increasing and decreasing and/or opening and blocking the flow-through cross section of the exhaust gas recirculation line (9) at predetermined or regulated switching points in time, and
wherein a controller (14) is provided which switches the exhaust gas recirculation valve (12) permanently between its end positions to adjust a high exhaust gas recirculation rate at the predetermined clock frequency.

18. The exhaust gas recirculation apparatus according to claim 17,
wherein a controller (14) is provided that switches the exhaust gas recirculation valve (12) into its first end position for blocking the exhaust gas recirculation line or for adjusting a low exhaust gas recirculation rate and holds it in that position.

19. The exhaust gas recirculation apparatus according to claim 17,
wherein a controller (14) is provided, switching the exhaust gas recirculation valve (12) into its second end position to adjust a moderate exhaust gas recirculation rate and holding it in that position.

20. An exhaust gas recirculation apparatus for an internal combustion engine (1), in particular in a motor vehicle,
having an exhaust gas recirculation line (9) which can be connected at the inlet end to an exhaust gas system (4) of an internal combustion engine (1) and at the exhaust end to a fresh gas system (3) of the internal combustion engine (1),
having an exhaust gas recirculation valve (12) arranged in the exhaust gas recirculation line (9) for adjusting an exhaust gas recirculation rate by varying the flow-through cross section of the exhaust gas recirculation line (9),
whereby the exhaust gas recirculation valve (12) is designed so that it adjusts the respective exhaust gas recirculation rate in a predetermined operating state of the exhaust gas recirculation apparatus (5) by alternately increasing and decreasing and/or opening and blocking the flow-through cross section of the exhaust gas recirculation line (9) at predetermined or regulated switching points in time; and
wherein a controller (14) is provided, moving the exhaust gas recirculation valve (12) into its first position for blocking the exhaust gas recirculation line (9) or for adjusting a low exhaust gas recirculation rate and holding it in this position.

21. The exhaust gas recirculation apparatus according to claim 20,
wherein a controller (14) is provided, moving the exhaust gas recirculation valve (12) into its second position and holding it in that position to adjust a moderate exhaust gas recirculation rate.

22. The exhaust gas recirculation apparatus according to claim 20,
wherein a controller (14) is provided, controlling the exhaust gas recirculation valve (12) for adjusting a high exhaust gas recirculation rate with the predetermined or regulated clock frequency ($f_T$) for permanent and alternating movement into the two positions.

23. An exhaust gas recirculation apparatus for an internal combustion engine (1), in particular in a motor vehicle,
having an exhaust gas recirculation line (9) which can be connected at the inlet end to an exhaust gas system (4) of an internal combustion engine (1) and at the exhaust end to a fresh gas system (3) of the internal combustion engine (1),
having an exhaust gas recirculation valve (12) arranged in the exhaust gas recirculation line (9) for adjusting an exhaust gas recirculation rate by varying the flow-through cross section of the exhaust gas recirculation line (9),
whereby the exhaust gas recirculation valve (12) is designed so that it adjusts the respective exhaust gas recirculation rate in a predetermined operating state of the exhaust gas recirculation apparatus (5) by alternately increasing and decreasing and/or opening and blocking the flow-through cross section of the exhaust gas recirculation line (9) at predetermined or regulated switching points in time; and
wherein a controller (14) is provided, moving the exhaust gas recirculation valve (12) into its second position and holding it in that position to adjust a moderate exhaust gas recirculation rate.

24. The exhaust gas recirculation apparatus according to claim 23,
wherein a controller (14) is provided, controlling the exhaust gas recirculation valve (12) for adjusting a high exhaust gas recirculation rate with the predetermined or regulated clock frequency ($f_T$) for permanent and alternating movement into the two positions.

25. The exhaust gas recirculation apparatus according to claim 23, wherein a controller (14) is provided, moving the exhaust gas recirculation valve (12) into its first position for blocking the exhaust gas recirculation line (9) or for adjusting a low exhaust gas recirculation rate and holding it in this position.

26. An exhaust gas recirculation apparatus for an internal combustion engine (1), in particular in a motor vehicle, having an exhaust gas recirculation line (9) which can be connected at the inlet end to an exhaust gas system (4) of an internal combustion engine (1) and at the exhaust end to a fresh gas system (3) of the internal combustion engine (1), having an exhaust gas recirculation valve (12) arranged in the exhaust gas recirculation line (9) for adjusting an exhaust gas recirculation rate by varying the flow-through cross section of the exhaust gas recirculation line (9), whereby the exhaust gas recirculation valve (12) is designed so that it adjusts the respective exhaust gas recirculation rate in a predetermined operating state of the exhaust gas recirculation apparatus (5) by alternately increasing and decreasing and/or opening and blocking the flow-through cross section of the exhaust gas recirculation line (9) at predetermined or regulated switching points in time; and wherein a controller (14) is provided, controlling the exhaust gas recirculation valve (12) for adjusting a high exhaust gas recirculation rate with the predetermined or regulated clock frequency ($f_T$) for permanent and alternating movement into the two positions.

27. The exhaust gas recirculation apparatus according to claim 26, wherein a controller (14) is provided, moving the exhaust gas recirculation valve (12) into its first position for blocking the exhaust gas recirculation line (9) or for adjusting a low exhaust gas recirculation rate and holding it in this position.

28. The exhaust gas recirculation apparatus according to claim 26, wherein a controller (14) is provided, moving the exhaust gas recirculation valve (12) into its second position and holding it in that position to adjust a moderate exhaust gas recirculation rate.

* * * * *